US010150145B1

(12) United States Patent
McNeil et al.

(10) Patent No.: US 10,150,145 B1
(45) Date of Patent: Dec. 11, 2018

(54) AUTOMATIC, VOLUMETRIC FLUSHING APPARATUS FOR REDUCING CONTAMINANTS IN A PLUMBING SYSTEM

(71) Applicants: Raymond A McNeil, Barrington, NH (US); Frank R Rosselli, Rollinsford, NH (US)

(72) Inventors: Raymond A McNeil, Barrington, NH (US); Frank R Rosselli, Rollinsford, NH (US)

( * ) Notice: Subject to any disclaimer, the term of this patent is extended or adjusted under 35 U.S.C. 154(b) by 0 days.

(21) Appl. No.: 15/995,172

(22) Filed: Jun. 1, 2018

(51) Int. Cl.
| | |
|---|---|
| *B08B 9/032* | (2006.01) |
| *E03B 7/07* | (2006.01) |
| *E03B 7/08* | (2006.01) |
| *E03B 7/00* | (2006.01) |
| *G01F 1/28* | (2006.01) |

(52) U.S. Cl.
CPC ............ *B08B 9/0325* (2013.01); *E03B 7/006* (2013.01); *E03B 7/071* (2013.01); *E03B 7/08* (2013.01); *G01F 1/28* (2013.01); *Y10T 137/4245* (2015.04); *Y10T 137/86397* (2015.04)

(58) Field of Classification Search
CPC ....... Y10T 137/4245; Y10T 137/86389; Y10T 137/86397; B08B 9/0325; B08B 9/032; B08B 9/0321; B08B 9/02; E03B 7/071; E03B 7/08; E03B 7/006
See application file for complete search history.

(56) References Cited

U.S. PATENT DOCUMENTS

| | | | | |
|---|---|---|---|---|
| 4,270,564 A | * | 6/1981 | Blackburn et al. ...... | A61B 5/08 128/205.12 |
| 5,287,876 A | | 2/1994 | Oze | |
| 5,921,270 A | * | 7/1999 | McCarty ............... | B08B 9/0325 137/240 |
| 6,035,704 A | * | 3/2000 | Newman ................ | E03B 7/006 137/236.1 |
| 6,898,552 B2 | | 5/2005 | Marcichow | |
| | | | (Continued) | |

FOREIGN PATENT DOCUMENTS

| | | |
|---|---|---|
| DE | 102014104393 A1 | 10/2014 |
| DE | 102014104395 A1 | 10/2014 |
| | (Continued) | |

*Primary Examiner* — Kevin Lee
(74) *Attorney, Agent, or Firm* — Maine Cernota & Rardin

(57) ABSTRACT

An automated water purging apparatus prevents dispensing of contaminated water by volumetrically flushing a standing volume of water between a tap and an exterior inlet as required. Volumetric control of flushing and usage monitoring between flushing events minimize water waste and delivery delays. Embodiments operate in demand and/or periodic modes, and switch therebetween according to a user-specified schedule. A controller and valve can be powered by a battery that is recharged by energy derived from water flow through the apparatus. Wireless and/or network connectivity can enable remote communication with the controller via a remote console and/or other wired and wireless devices. Embodiments take partial purge usage volumes into account when determining if standing water is contaminated. Partial purge volumes can include volumes shared with other taps. Embodiments can alert users to potential leaks. Embodiments include a volumetric flow sensor at the external inlet shared among a plurality of taps.

25 Claims, 9 Drawing Sheets

(56) References Cited

U.S. PATENT DOCUMENTS

| | | | |
|---|---|---|---|
| 7,178,739 B2 * | 2/2007 | Taylor | E03B 7/006 |
| | | | 236/46 R |
| 7,240,853 B2 | 7/2007 | Taylor | |
| 7,337,800 B2 * | 3/2008 | Palm et al. | C02F 1/02 |
| | | | 137/238 |
| 9,957,697 B2 * | 5/2018 | Taylor et al. | E03B 7/08 |
| 10,022,755 B2 * | 7/2018 | Reiss et al. | B08B 9/032 |

FOREIGN PATENT DOCUMENTS

| | | | |
|---|---|---|---|
| EP | 1964983 | A1 | 9/2008 |
| WO | 2005124494 | A2 | 12/2005 |

\* cited by examiner

AUTOMATIC, VOLUMETRIC FLUSHING APPARATUS FOR REDUCING CONTAMINANTS IN A PLUMBING SYSTEM

FIELD OF THE INVENTION

The invention relates to plumbing systems, and more particularly, to apparatus and methods for reducing contaminants in plumbing systems that supply drinking water.

BACKGROUND OF THE INVENTION

Contamination of drinking water by lead, copper, and other metals, as well as by biological and other contaminants, can pose significant health risks in many cases, especially if lead or copper pipes or fittings, or any other contaminant sources, are present in the plumbing system of a home or other building. Lead can enter drinking water when service pipes that contain lead corrode, for example when the water has high acidity or high alkalinity that corrodes pipes and fixtures. The most common problem is with brass or chrome-plated brass faucets and fixtures, and with lead solder, from which significant amounts of lead can enter into the water. Even though these materials have been largely banned from use in new construction, some homes, especially older homes, may still have significant amounts of lead in their plumbing systems. Often, such contaminants are present only in the plumbing of the building itself.

In such cases, if water is allowed to stand within an indoor plumbing system for longer than a minimum "build-up period," which is typically several hours but can be more or less, lead and other contaminants can slowly leech into the water, such that the contaminants are ingested upon the next use of a drinking water tap. Similarly, biological contaminants that are largely suppressed due to low temperatures in exterior, primary water supply systems can multiply and increase in concentration when water is allowed to stand and to rise to warmer temperatures within the plumbing system of a home or other building.

Lead, in particular, can pose a significant health risk to a person if too much of it enters the person's body. Lead builds up in the body over many years, and can cause damage to the brain, red blood cells, and kidneys.

Lead in drinking water can be a special problem for pregnant women, and for infants, whose diets may be mostly liquids, such as baby formulas or concentrated juices mixed with water. Smaller bodies can absorb lead more rapidly than bigger ones, so amounts of lead that would not hurt an adult can be very harmful to a child. A child's mental and physical growth can be permanently harmed by too much lead.

Lead is rarely found in natural sources of water such as rivers and lakes or underground aquifers. Nor are lead and other contaminants typically found in the water distribution systems that distribute water from a primary source to individual homes and other buildings. Instead, drinking water is most often contaminated due to corrosion of pipes and fittings and growth of biological organisms while the water is standing in pipes that lead from the primary source to the consumer, for example through a local distribution system or within a home or other building, waiting to be dispensed and consumed.

It should be noted that, while some parts of the present disclosure recite contamination by lead of pluming in a house or home, the present disclosure also applies to contamination by other metals and substances, including biological substances that may tend to breed in standing water that is within a plumbing system of a building, or of any other secondary water distribution system, but be relatively absent from primary distribution lines.

When lead or another toxic substance is found in the drinking water of a home or other building or distribution system, the resident or other owner faces a difficult decision regarding whether to commence an expensive project to replace the plumbing system, or to install expensive, high maintenance filters.

Another approach to mitigate the threat of contaminants from drinking water within a building is to flush taps before they are used to dispense drinking water, so that any water that may have become contaminated while standing within the plumbing system is replaced by freshly delivered water that can be assumed to be free of contaminants. However, this approach requires patience and discipline on the part of the user, and is therefore subject to human error. Also, considerable amounts of water can be wasted due to such decontamination flushing. For example, if the water is allowed to flush from a tap until a noticeable drop in temperature is felt, this will result in purging not only of the water within the building, but also the water within the exterior distribution pipes that deliver water from a primary source to the building. These exterior distribution pipes are typically free of contaminants, but are often close enough to the terrain surface to contain tepid water that is similar in temperature to the water within the building. As a result, both time and water are wasted.

Purging of contaminants can be automated by devices that flush a tap on a timed basis, whereby the tap is automatically flushed for a specified flushing duration, and the flushing is repeated periodically according to a maximum "build-up" time that is determined to be "safe." Automated flushing can provide clean water to a user on demand, eliminating the need for user discipline and patience. However, these automated approaches can greatly increase the amount of water that is wasted, by flushing a tap even when it is not being used, and by flushing more water than necessary each time the tap is purged of contaminants.

Flushing can also be used to eliminate contaminants that are temporarily introduced into a water source due to a repair or other temporary cause. For example, a repair made at a primary water source may introduce or stir up sediments that increase water turbidity, or a workman may add a dose of chlorine to the water after performing a repair, so as to eliminate any biological contamination that may have been introduced. These contaminates will typically remain until they are cleared out of the system through normal water use and/or flushing.

What is needed, therefore, is an apparatus and method for reducing ingestion by a user from a water tap of contaminants in a plumbing system, without replacement of the plumbing system, without need for expensive filtration systems, and with minimum waste of water.

SUMMARY OF THE INVENTION

An automated water purging apparatus and method are disclosed for reducing ingestion by a user from a water tap of contaminants in a plumbing system, without replacement of the plumbing system, without need for expensive filtration systems, and with minimum waste of water. The disclosed purging apparatus includes a flow sensor that enables a controller to calculate and monitor a volumetric flow of water through the apparatus. In embodiments, the purging apparatus is connected to the plumbing system in close proximity to the tap. In some of these embodiments, the water inlet to the tap, referred to herein as the "tap water inlet," is diverted through the purging apparatus before reaching the tap, and a bypass outlet from the purging apparatus is connected to a drain that is associated with the tap.

In embodiments, a recharger is provided that utilizes energy from the flow of water through the apparatus to recharge a battery that is included in the apparatus. For example, in some embodiments the flow sensor is a "paddle wheel" sensor, wherein rotation of the paddle during water flow is used to recharge the battery as well as to sense the volumetric flow of the water.

During a calibration phase of the disclosed method, the volume of water, referred to herein as the "standing volume," that is contained within the plumbing system between the tap and an uncontaminated, external water inlet where uncontaminated water enters the plumbing system, is estimated, and used to determine a "purging volume" of water to be flushed whenever a full purge is required. In some embodiments, the standing volume is estimated based on a known or measured diameter of the plumbing system pipes and the estimated distance from the tap to the external water inlet. In other embodiments, the standing volume is estimated by introducing a dye into the water at the external water inlet, and measuring a volume of water that flows from the tap before the dye appears there.

In some embodiments, the controller accepts the estimated standing volume from the user as an input. In other embodiments, the controller calculates the estimated standing volume according to data provided by the user. For example, in embodiments the controller is able to estimate the standing volume based on input by the user of the pipe diameter and distance to the inlet. In other embodiments, the controller initiates a flush of the tap, and the user provides an indication to the controller, such as pushing a button, when a dye introduce by the user at the external water inlet appears at the tap, whereupon the controller is able to calculate the standing volume. In various embodiments, the user is able to specify a "safety factor" that is added to the standing volume so as to obtain the purging volume.

During the calibration phase, a purging interval is also determined, which is the maximum amount of time that can be allowed to pass before contaminants in the standing volume will have risen to unacceptable levels. In various embodiments, the purging interval is input by the user based on published safety standards and/or on measurements made on water samples obtained from the tap after various intervals of flushing.

In some embodiments, after calibration is completed, purging of the tap is implemented on a demand basis, whereby an initiation of flow that is sensed by the flow sensor alerts the controller to a demand for water from the tap. Upon being alerted to the demand, the controller allows the water to flow to the user if a purge flag indicates that the elapsed time since the most recent purge of the tap is less than the purging interval. If the purge flag indicates that the elapsed time is greater than the purging interval, then the controller initiates a purge, and only allows water to flow to the user after the purge is completed.

In other embodiments, purging of the tap is implemented on a periodic basis, whereby a purge of the tap is initiated according to a purge timer whenever the elapsed time since the last purge reaches the purging interval.

In various embodiments, the controller is able to operate in either demand or periodic mode, and is switchable between modes by the user. Embodiments further allow the user to specify a schedule of times of the day and days of the week when the controller will operate in demand mode (for example late at night), and when the controller will operate in periodic mode (for example at times of peak usage). In embodiments, when the controller senses a usage event in which one or more users cause the tap to dispense a total volume of water that is greater than the purge volume, then this usage event is considered to be a full purge, and the demand flag or periodic timer is reset accordingly. For this reason, usage events that dispense a volume of water that is greater than the purge volume are referred to herein as "full purge usage events."

In embodiments, the controller is able to adjust its behavior to take advantage of situations wherein there has been at least one usage event since the last full purge, but the most recent usage event has been a "partial purge usage event," in that the most recent usage event has consumed a volume of water that is less than the purging volume. According to this approach, in embodiments, it is assumed that there is rapid equalization of the contaminate levels throughout the standing volume, and it is further assumed that the contaminate levels rise within the standing volume between purges and usage events according to a known behavior, such as according to a rate R, which can be an exponential rate.

According to this approach, when a partial purge usage event occurs that reduces the contaminate levels in the standing volume, but does not completely remove all contaminants, the controller is able to calculate a modified purging time before the contaminants will rise to their maximum allowable level and the next full purge will be needed. As a result, this approach can provide a further reduction of the water wastage and/or waiting times for usage by taking advantage of partial purge usage events. This approach is easily extended in embodiments to cases where a plurality of partial purge usage events occur between full purges.

In various embodiments, the controller is accessible via a wired network such as the internet, and/or wirelessly, for example by wireless internet, cellular communication, and/or Bluetooth. In some of these embodiments, a wired or wireless link enables a controller input console to be placed in a user-accessible location, while the remainder of the controller and the flow sensor are located at the plumbing close to the tap, which is typically under a counter, within a cabinet, or behind a wall. In embodiments, a user is able to access the controller remotely over the internet, thereby allowing the user, for example, to instruct a controller installed at a vacation home to switch from demand mode to periodic mode in anticipation of the user's arrival at the vacation home.

In some embodiments where the disclosed apparatus is installed at more than one tap, for example at both a first tap and a second tap within an indoor plumbing system, the first and second controllers communicate with each other by wired and/or wireless communication. In some of these embodiments, the calibration step includes providing estimates to the controllers of portions of the first and second standing volumes that are shared. This allows the system to further reduce wasting of water and/or user wait times, because it allows a partial or full purge of the first tap to be treated as a partial purge of the second tap according to the fraction of the first standing volume that is shared by the second standing volume, and vice versa.

Embodiments further reduce wastage of water by including a water recovery drain as part of the purging system. For example, rather than simply flushing water down a conventional drain, embodiments assume that only the "cold" tap water will be consumed, and divert the flushed water through a water recovery drain into the holding tank of a hot water heater. In other embodiments, the flushed water is diverted into a reservoir that is used for flushing toilets, for irrigation, or for some other purpose wherein it is not ingested.

In embodiments, a flow sensor is provided at the inlet to the plumbing system of the home or building. In some of these embodiments, information from the inlet flow sensor is shared by a plurality of controllers installed at a plurality of taps, in lieu of installing a separate flow sensor at each of the taps. In various embodiments where all of the drinking taps in the system are equipped with purging devices, information from the inlet sensor and communication and collaboration between the controllers at the plurality of taps allows the system to perform "whole house" purges whereby all of the taps initiate a purge while the inlet flow sensor monitors the total water consumption of the system. In embodiments, due to overlapping portions of the standing volumes, this approach can provide a full purge of all of the taps while consuming less water than would otherwise be consumed if each of the purging units performed a separate full purge.

In some embodiments, flow sensor information from sensors located at one or more taps and or at the inlet can be used by the system to send a remote alert to a user by wired or wireless means if an apparent water leak is detected, for example if a small but steady, long-lasting flow is detected that may be a dripping tap, or a large flow is detected that continues for more than a short time, which may indicate a burst pipe.

In certain embodiments, the apparatus further includes a contaminant sensor that is in communication with the controller and is configured to detect contaminants in the water near the tap. The sensor enables the controller to verify the success of a purge by measuring the contaminant level immediately after a purge. And in some of these embodiments, a purge can be initiated upon detection by the sensor of unacceptable contamination levels near the tap, even if the purging interval has not yet elapsed.

In various embodiments, the contaminant sensor is able to detect any or all of heavy metal contaminants, biological contaminants, variations in chlorine levels outside of acceptable limits, variation of the pH of the water (acidity or alkalinity) outside of acceptable limits, and/or excess turbidity of the water due e.g. to particulate contaminants. Depending on the embodiment and the type of contaminant, embodiments are able to initiate a purge that continues until the contaminant is dissipated, even if the contaminant originates at the primary water source, such as turbidity or chlorine introduced at the source during a repair. In other embodiments, the apparatus is able to issue an alert to a user or owner if a change in conditions is detected. For example, the system may alert a user or owner if a persistent change in the pH (acidity or alkalinity) is detected that may change the rate at which contaminants such as lead or copper leach into the standing volume between flushes, and may therefore require a re-calibration of the system.

One general aspect of the present invention is a volumetric flushing apparatus for flushing contaminants from an plumbing system, the indoor plumbing system being configured during a usage event to deliver water from an exterior water inlet through a standing volume of the interior plumbing system to a tap, the standing volume remaining filled with water between usage events. The apparatus includes a controller, a valve proximal to and in flow communication with the tap, the valve being configured under control of the controller to switch between a delivery mode wherein the standing volume is connected to the tap and a flushing mode wherein the standing volume is connected to a bypass outlet, and a volumetric flow sensor in communication with the controller and configured to measure a volume of water flowing through the standing volume to the valve.

The controller is configured to initiate a purge event before delivering water to the tap if the water in the standing volume is deemed by the controller to potentially contain contaminated water, where contaminated water refers to water containing more than a designated maximum level of contaminants, a purge event being an event wherein the valve is switched to its flushing mode until a purging volume of water has flowed from the standing volume into the drain and has been replaced by uncontaminated water from the exterior water inlet.

The controller is also configured to monitor usage flow volumes of water to the tap during usage events, and to designate a usage event as a purge event if the usage flow volume of the usage event is greater than the purging volume.

In embodiments, the apparatus further comprises a battery, and a battery charger configured to recharge the battery using energy derived from water flowing through the apparatus. In some of these embodiments, the volumetric flow sensor is a paddle wheel flow sensor, and the recharger is configured to recharge the battery using energy derived from a paddle wheel of the paddle wheel flow sensor.

Any of the above embodiments can further include a wired or wireless interface that enables a user to communicate with the controller using a device that is remote from the controller. In some of these embodiments, the controller includes a network interface that enables remote communication between a user and the controller.

Any of the above embodiments can further include a wireless interface that enables a user to communicate with the controller via a wireless communication link.

In any of the above embodiments, the volumetric flow sensor can be proximal to the valve.

In any of the above embodiments, the volumetric flow sensor can be proximal to the exterior water inlet.

In any of the above embodiments, the controller can be operable in a demand mode, wherein, upon initiating by a user of a usage event, if the water in the standing volume is deemed by the controller to potentially contain contaminated water, the controller initiates a purge event and delays delivery of water to the tap until the purge event has completed. In some of these embodiments, the controller is operable in a periodic mode, wherein a purge event is initiated by the controller whenever the water in the standing volume is deemed by the controller to potentially contain contaminated water.

In any of the above embodiments, the controller can be switchable between the demand mode the periodic mode. In some of these embodiments, the controller is operable according to a user-specified schedule that switches the controller between the demand mode and the periodic mode.

In any of the above embodiments, the water in the standing volume can be deemed by the controller to potentially contain contaminated water whenever an elapsed time since a most recent purge event exceeds a designated purging interval.

In any of the above embodiments, if a usage event that was not a purge event has occurred more recently than a most recent purge event, the controller can determine whether the standing volume is deemed to potentially contain contaminated water according to an elapsed time since the most recent purge event, an elapsed time since the usage event, and the usage flow volume of the usage event.

In any of the above embodiments, the controller can be configured to issue an alarm to a user if the volumetric flow sensor senses a pattern of flow that corresponds with unintentional leakage of water from the standing volume.

In any of the above embodiments, the bypass outlet can be in fluid communication with a drain that transports water to a drainage system.

Any of the above embodiments can further include a recovery drainage system in fluid communication with the bypass outlet and configured to deliver water from the bypass outlet to a storage container from which water can be used for non-ingestion purposes.

Any of the above embodiments can further include a contamination sensor in communication with the controller and configured to detect contaminants in the water proximal to the tap. In some of these embodiments, the controller is configured to verify that the contaminated water in the standing volume has been replaced by uncontaminated water after a purge event. And in some of these embodiments, the controller is configured to alert a user if the sensor detects that the contaminated water in the standing volume has not been replaced by uncontaminated water after a purge event. In any of these embodiments, the controller can be configured to initiate a purge event before delivering water to the tap if the sensor detects contaminated water proximal to the tap. And in any of these embodiments, the contaminant sensor can be able to detect at least one of:
- the presence of a metallic contaminant in the water;
- the presence of a biological contaminant in the water;
- a deviation of chlorine concentration in the water beyond acceptable chlorine limits;
- a rise in turbidity of the water beyond an acceptable turbidity limit; and
- a deviation of the pH of the water beyond acceptable pH limits.

A second general aspect of the present invention is a volumetric flushing system for flushing contaminants from an plumbing system, the indoor plumbing system being configured during a usage event to deliver water from an exterior water inlet to one of a plurality of taps through a corresponding one of a plurality of standing volumes of the interior plumbing system, the standing volumes remaining filled with water between usage events of the corresponding taps. The system includes at least one controller, for each of the plurality of taps, a valve proximal to and in flow communication with the tap, the valve being configured under control of the at least one controller to switch between a delivery mode wherein the standing volume corresponding to the tap is connected to the tap and a flushing mode wherein the standing volume corresponding to the tap is connected to a bypass outlet, and at least one volumetric flow sensor in communication with the at least one controller and configured to measure a volume of water flowing through the standing volumes to the valves that are proximal to the taps.

For each of the taps, the at least one controller is configured to initiate a purge of the standing volume corresponding to the tap before delivering water to the tap if the water in the standing volume corresponding to the tap is deemed by the controller to potentially contain contaminated water, where contaminated water refers to water containing more than a designated maximum level of contaminants, a purge of a standing volume that corresponds to a tap including switching of the valve that is proximal to the tap to its flushing mode until a purging volume of water applicable to the tap has flowed from the standing volume into the drain corresponding to the tap, and has been replaced by uncontaminated water from the exterior water inlet.

For each of the taps, the at least one controller is also configured to monitor usage flow volumes of water to the tap during usage events of the tap, and to designate a usage event of the tap as a purge event of the tap if the usage flow volume of the usage event is greater than the purging volume applicable to the tap.

In embodiments, the at least one volumetric flow sensor includes a flow sensor proximal to the exterior water inlet.

And in any of these embodiments, the at least one controller can determine whether a first standing volume of the plurality of standing volumes corresponding to a first tap of the plurality of taps is deemed to potentially contain contaminated water according to an elapsed time since a most recent purge of the first standing volume, and an elapsed time since a most recent purge a second of the plurality standing volumes that results in a reduction of contaminants in the first standing volume due to a shared volume that is common to the first and second standing volumes.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
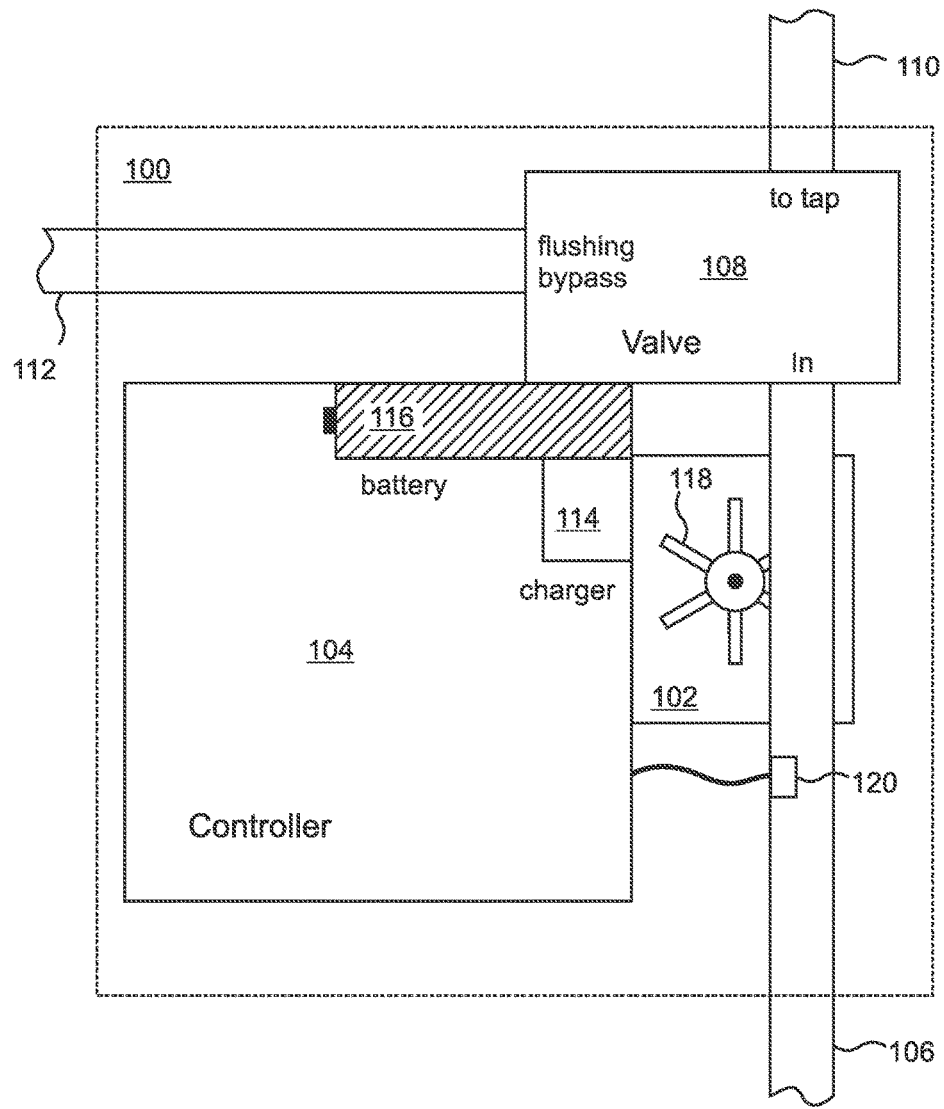
FIG. 1 is a block diagram of an embodiment of the present invention.

The present invention is an automated water purging apparatus and method that can reduce ingestion by a user from a water tap of contaminants that accumulate in a plumbing system, without replacement of the plumbing system, without need for expensive filtration systems, and with minimum waste of water. With reference to FIG. 1, the disclosed purging apparatus 100 includes a flow sensor 102 that enables a controller 104 to calculate and monitor a volumetric flow of water through the apparatus 100. In embodiments, the purging apparatus is connected to the plumbing system in close proximity to the tap. In some of these embodiments, the drinking water flowing to the tap is diverted into in input 106 if the purging apparatus 100 and through the flow sensor 102, after which the water flows to a valve that determines whether the water flows out through a dispensing output pipe 110 to the tap, or through a bypass outlet pipe 112 to the drain that is associated with the tap, or to some other flushing system.

In embodiments, a recharger 114 is provided that utilizes energy from the flow of water through the system to recharge a battery 116 that is included in the apparatus 100. For example, in some embodiments the flow sensor 102 is a "paddle wheel" sensor, wherein rotation of the paddle 118 during water flow is used to recharge the battery 116 as well as to sense the volumetric flow of the water.

Figure 2A:
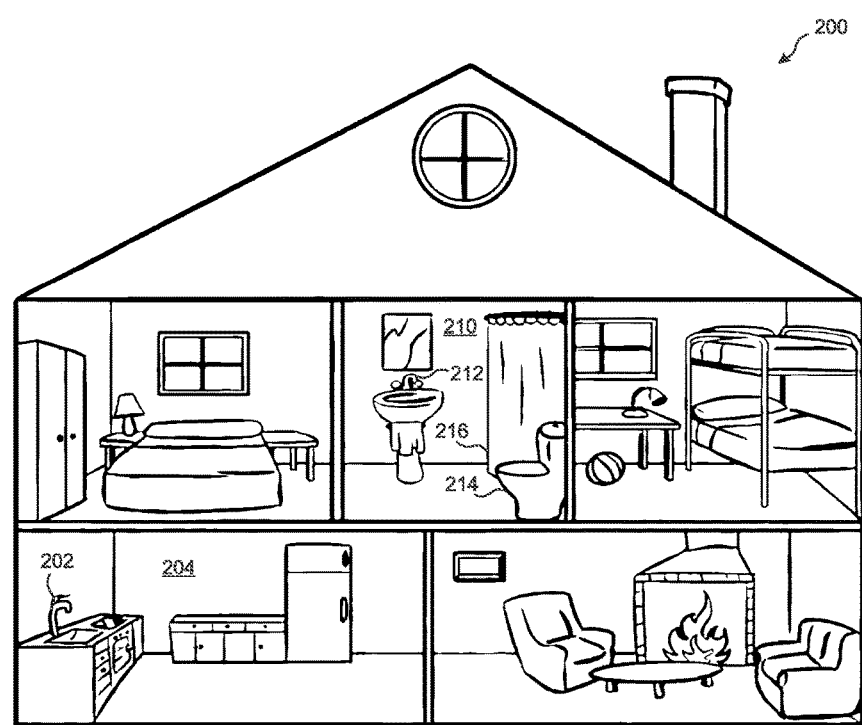
FIG. 2A is an illustration of a home that includes an interior plumbing system.
Figure 2B:
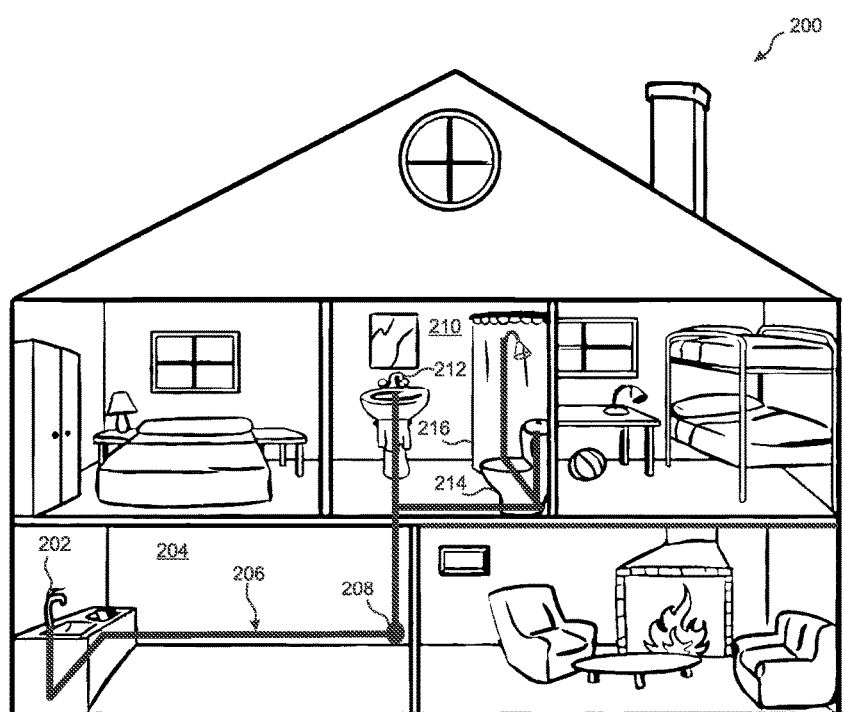
FIG. 2B is an illustration similar to FIG. 2A but including an indication of the internal plumbing system.

In certain embodiments, the apparatus 100 further includes a contaminant sensor 120 that is in communication with the controller 104 and is configured to detect contaminants in the water near the tap. FIG. 2A illustrates a typical residential house 200 which includes a tap 202 that dispenses drinking water in a kitchen 204, as well as a bathroom 210 where water is dispensed from a bathroom tap 212, into a toilet 214, and into a shower 216. With reference to FIG. 2B, water is fed to the water outlets 202, 212, 214, 216 through pipes of a plumbing system 206 that connects an external water inlet 208 to the taps 202, 212 and other outlets 214, 216. In the embodiment of FIG. 2A, it is assumed that the water is free of contaminants at the water inlet to the house 208. In similar embodiments, the plumbing system 206 includes pipes external to the house 200 and/or external to any other building that are subject to contamination while water is standing therein, and that deliver uncontaminated water from an external water inlet 208 to one or more consumption taps 202, 212.

Figure 2C:
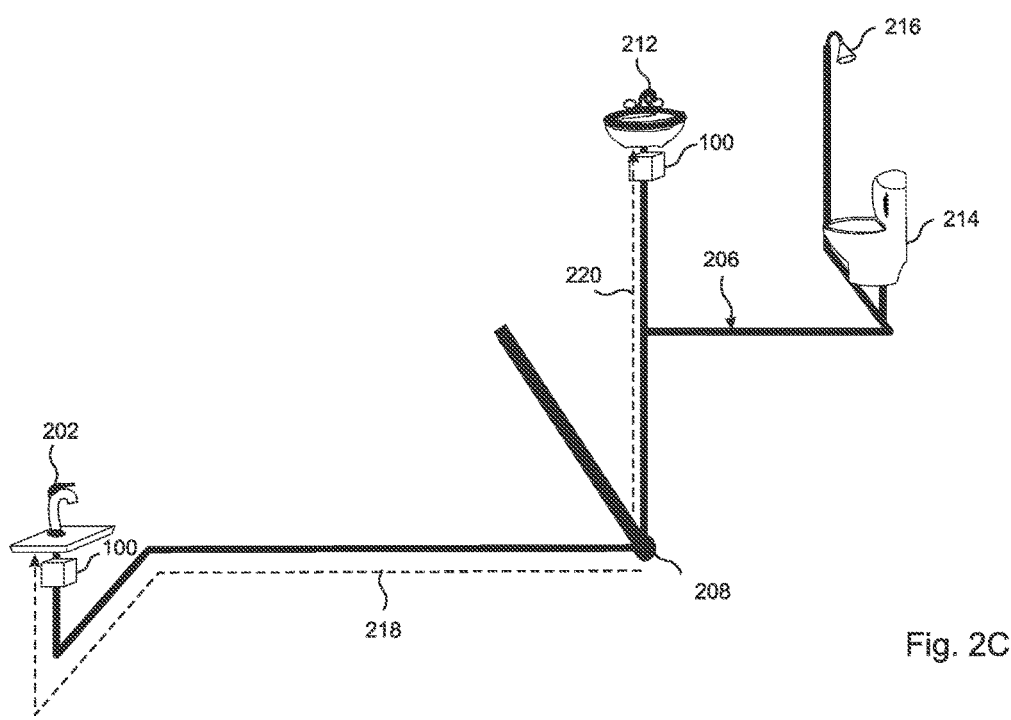
FIG. 2C is an illustration showing only the interior plumbing system of FIG. 2B.

The plumbing system 206 of FIGS. 2A and 2B is illustrated without the house 200 in FIG. 2C. It can be seen that each of the taps 202, 212 is associated with one or more pipes 206 that convey water from the external water inlet 208 to the taps 202, 212. The series of pipes that convey water to the kitchen tap 202 is indicated by dashed line 218 in the drawing. Between usage events, a certain volume of water stands in those pipes 218, which is referred to herein as the "standing volume" of the tap 202. Obviously, each of the taps 202, 212 is associated with a corresponding standing volume 216, 220 of the plumbing system 206. When contaminants are allowed to build up to an unacceptable level in the plumbing system 206 between usage events, it is necessary for the disclosed purging apparatus 100 to flush the associated standing volume 218, 220 from the tap 202, 212 before use, so that water that has been newly delivered at the external inlet 208 flows from the tap 202, 212.

After installation of the disclosed purging apparatus 100 at a tap (e.g. 202), it is necessary in embodiments to calibrate the apparatus 100 before it can be operated. As part of the calibration, in embodiments, the standing volume 218 that is applicable to that tap 202 must be estimated, and used to determine a "purging volume" of water to be flushed by the apparatus 100 whenever a full purge is required. In some embodiments, the standing volume is estimated based on a known or measured diameter of the plumbing system pipes 206 and the estimated distance 218 from the tap 202 to the external inlet 208. In other embodiments, the standing volume is estimated by introducing a dye into the water at the inlet 208, and measuring a volume of water that flows from the tap 202 before the dye appears.

In various embodiments, the controller 104 accepts the estimated standing volume from the user as an input. In other embodiments, the controller 104 calculates the estimated standing volume according to data provided by the user. For example, in embodiments the controller is able to estimate the standing volume based on input by the user of the pipe diameter and distance to the inlet 218. In other embodiments, the controller initiates a flush of the tap, and the user provides an indication to the controller when a dye introduce by the user at the inlet appears at the tap, whereupon the controller is able to calculate the standing volume. In various embodiments, the user is able to specify a "safety factor" that is added to the standing volume so as to obtain the purging volume.

Figure 3:
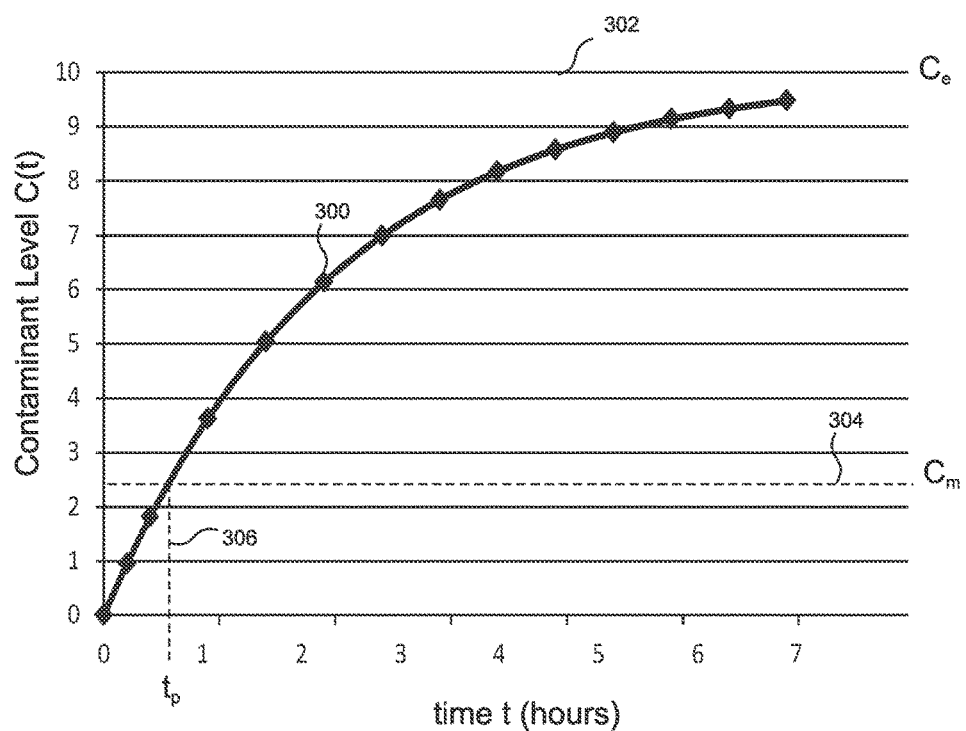
FIG. 3 is a graph indicating increasing levels with time of water contamination in a standing volume according to embodiments of the present invention.

During the calibration phase, a purging interval is also determined, which is the maximum amount of time that can be allowed to pass before contaminants in the standing volume will have risen to unacceptable levels. In various embodiments, the purging interval is input by the user based on published safety standards and/or on measurements made on water samples obtained from the tap after various intervals of flushing. An example is shown in FIG. 3, where a plurality of measurements 300 of water contamination are plotted on a graph as a function of time t after a purge. It can be seen that the contamination level rises toward an equilibrium value $C_e$ 302, and that it reaches a maximum acceptable level $C_m$ 304 after a time $t_p$ 306, which is the purging interval.

Figure 4:
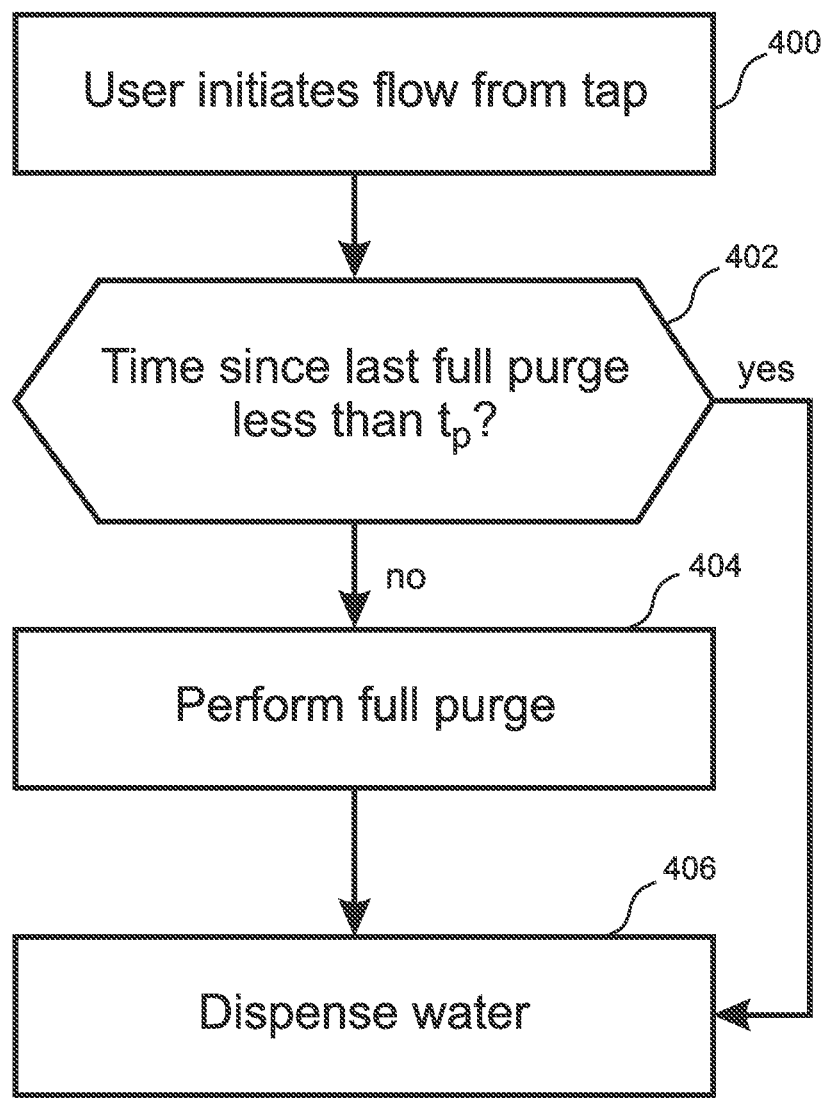
FIG. 4 is a flow diagram illustrating steps in a method embodiment of the present invention.

In some embodiments, after calibration is completed, purging of the tap is implemented on a demand basis, as illustrated in FIG. 4, whereby an initiation of flow 400 that is sensed by the flow sensor 102 alerts the controller 104 to a demand for water from the tap. Upon being alerted to the demand, the controller 104 allows the water to flow to the user 406 if a purge flag indicates that the elapsed time since the most recent purge of the tap is less than the purging interval 402. If the purge flag indicates that the elapsed time is greater than the purging interval, then the controller 104 initiates a purge 404, and only allows water to flow to the user 406 after the purge is completed.

In other embodiments, purging of the tap is implemented on a periodic basis, whereby a purge of the tap is initiated according to a purge timer whenever the elapsed time since the last purge reaches the purging interval.

In various embodiments, the controller 104 is able to operate in either demand or periodic mode, and is switchable between modes by the user. Embodiments further allow the user to specify a schedule of times of the day and days of the week when the controller 104 will operate in demand mode (for example late at night), and when the controller 104 will operate in periodic mode (for example at times of peak usage). In embodiments, when the controller 104 senses a usage event in which a user causes the tap to dispense a total volume of water that is greater than the purge volume, then this usage event is considered to be a full purge, and the demand flag or periodic timer is reset accordingly. For this reason, usage events that dispense a volume of water that is greater than the purge volume are referred to herein as a "full purge usage events."

Figure 5:
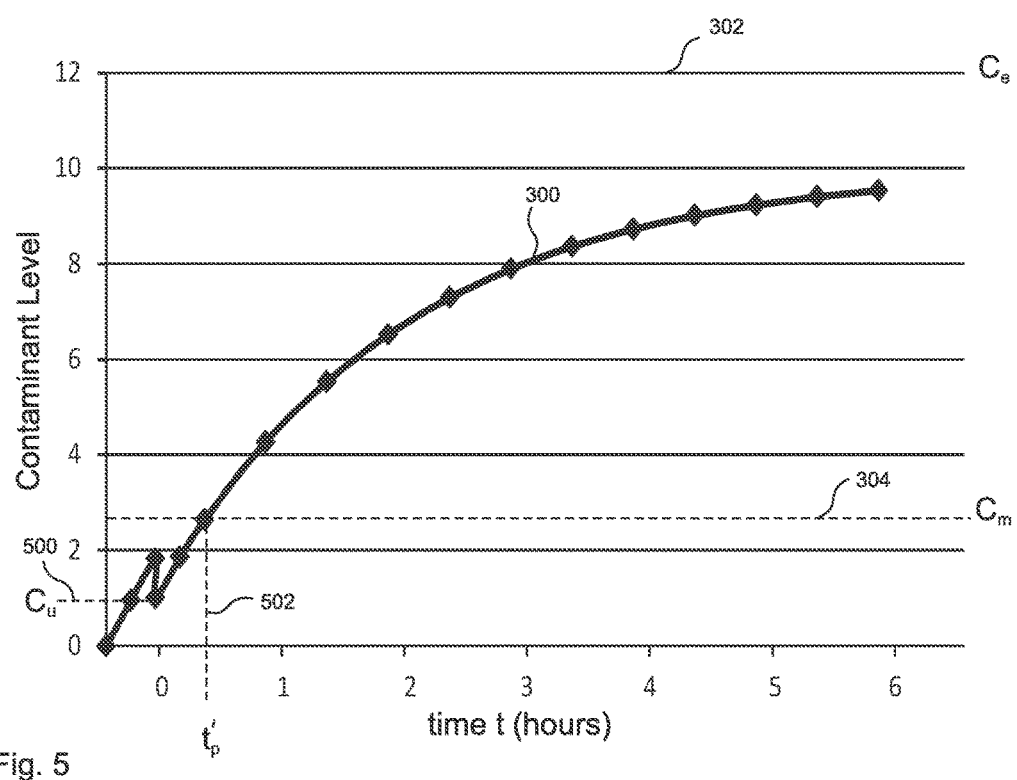
FIG. 5 is a graph similar to FIG. 3, but indicating a partial purge event occurring before the maximum allowable contamination level is reached.

With reference to FIG. 5, in embodiments, the controller 104 is able to adjust its behavior to take advantage of situations wherein the most recent usage event since the last full purge has been a "partial purge usage event," in that the usage event consumed a volume of water that was less than the purging volume. In the figure, it can be seen that the contaminate levels were rising from zero after a full purge, but then dropped at the time labeled as zero due to a partial purge usage event. While the usage event did not reduce the contaminates to zero, nevertheless the partial usage event has the effect of delaying the time at which the maximum contaminate level is reached 304.

According to this approach, in embodiments, it is assumed that there is rapid equalization of the contaminate levels throughout the standing volume, and it is further assumed that the contaminate levels rise within the standing volume between purges and usage events according to a known behavior, such as according to an exponential rate R. For example, with reference again to FIG. 3, if the contaminate level is assumed to be zero immediately after a full purge (time=0), and is assumed to reach an equilibrium level $C_e$ 302 after a long standing period, then embodiments assume that the contaminant level C(t) in the standing volume at a time t after a full purge is governed by an exponential rise as shown in the figure, according to the formula:

$$C(t)=C_e*(1-\exp(-Rt)) \quad (1)$$

According to this example, the maximum allowable contaminant level $C_m$ is given by:

$$C_m=C_e*(1-\exp(-Rt_p)) \quad (2)$$

where $t_p$ is the purging interval.

With reference to FIG. 5, the contaminant level Cu 500 after a partial purge usage event (time=0) that consumed a volume of water Vu that is less than the standing volume Vs is given by:

$$C_u=C_e*(V_s-V_u) \quad (3)$$

Accordingly, at a time t after the partial purge usage event, the contaminant level will be given by $$C(t)=C_u+(C_e-C_u)*(1-\exp(-Rt)) \quad (4)$$

Since the partial purge usage event has reduced the contaminant level below the level immediately before the event, but not all the way to zero, there is a modified purging period $t_p'$ 502 that can be allowed to elapse after the partial purge usage event before the next purge is required. The modified purging time $t_p'$ 502 is the amount of time after the partial purge usage event that is required for the contaminant level to rise from $C_u$ to $C_m$, and is therefore the time at which C(t) in equation (4) equals $C_m$. Setting C(t) equal to $C_m$ and t equal to $t_p'$ in equation (4), and solving for $t_p'$ leads to the solution $$t_p' = \frac{1}{R}\ln\left(\frac{C_e - C_u}{C_e - C_m}\right) \quad (5)$$

Of course, this approach can be readily extended and applied to circumstances wherein there is more than one partial purge usage event between full purges.

Accordingly, in embodiments this approach allows the system to further reduce wastage of water and waiting time for usage by taking advantage of partial purge usage events due to dispensing of water to users between full purges.

Figure 6:
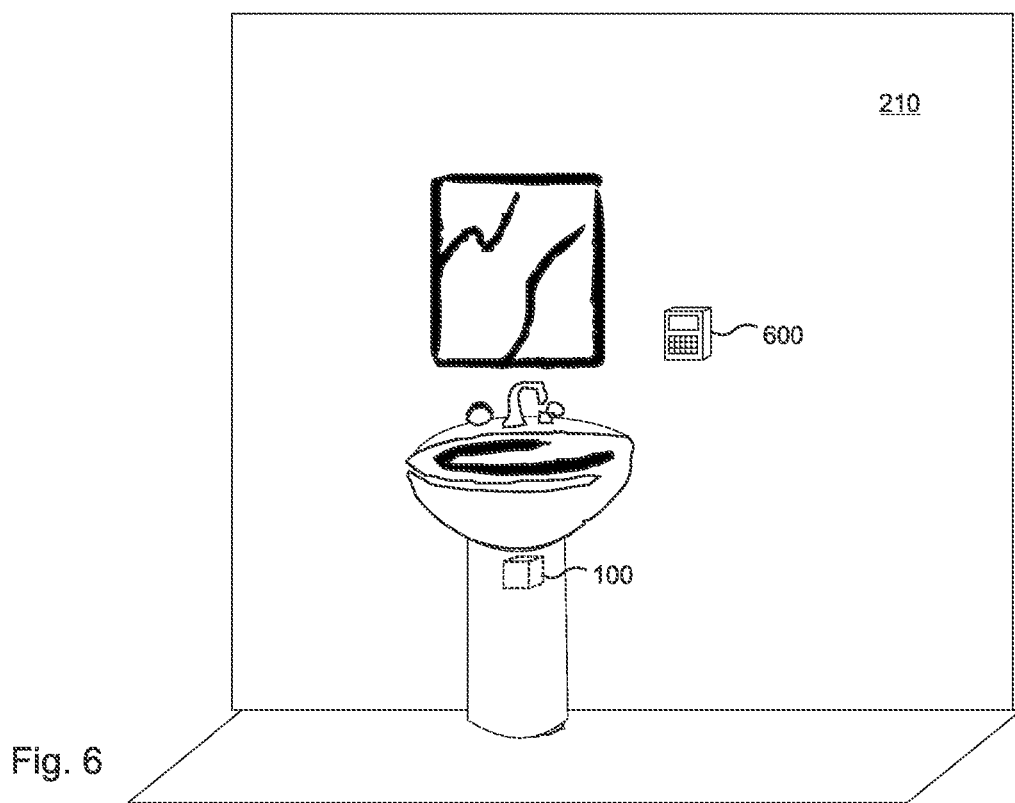
FIG. 6 is an illustration showing placement of a controller console remote from the controller in an embodiment of the present invention.

In various embodiments, the controller 104 is accessible via a wired network such as the internet, and/or wirelessly, for example by wireless internet, cellular communication, and/or Bluetooth. With reference to FIG. 6, in some embodiments, a wired or wireless link enables an input console 600 to be placed in a user-accessible location, while the remainder of the controller 104 and the flow sensor are located at the plumbing close to the tap, which is typically under a counter or sink (as shown in the figure), within a cabinet, or behind a wall. In embodiments, a user is able to access the controller 104 remotely over the internet, thereby allowing the user, for example, to instruct a controller 104 installed at a vacation home to switch from demand mode to periodic mode in anticipation of the user's arrival at the vacation home.

Figure 7:
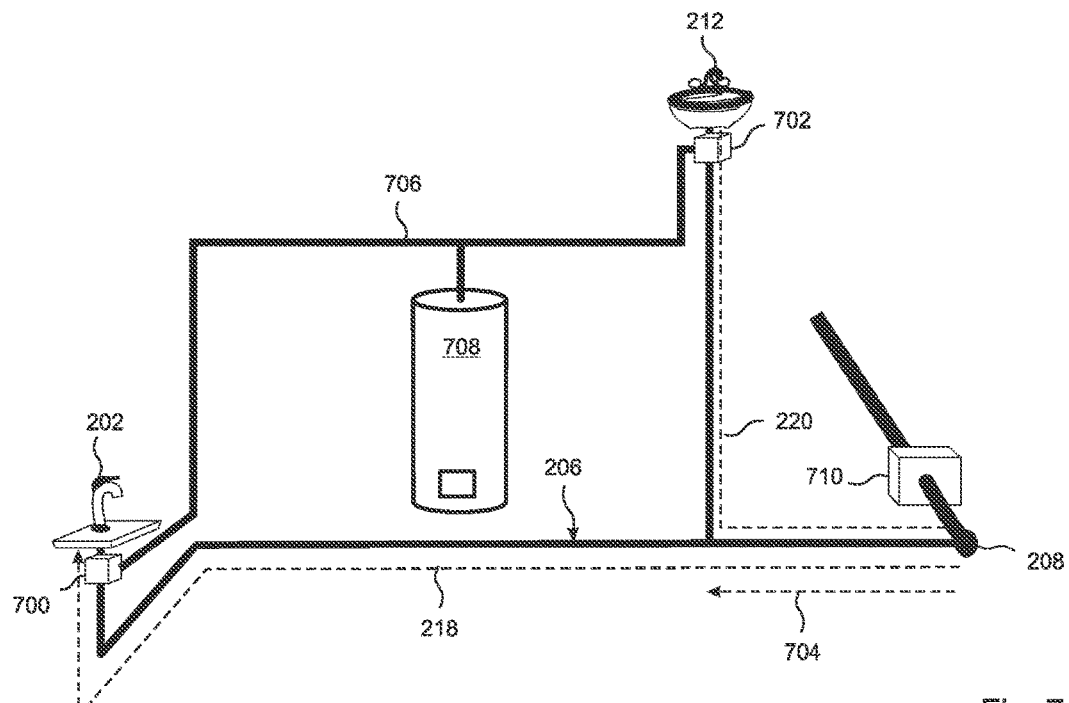
FIG. 7 is an illustration of an embodiment that includes a recovery drain system that directs flushed water into a hot water tank of the interior plumbing system.

With reference to FIG. 7, in some embodiments where the disclosed apparatus is installed at more than one tap, for example at both a first tap 202 and a second tap 212 within an indoor plumbing system 206, the first and second controllers 700, 702 communicate with each other by wired and/or wireless communication. In some of these embodiments, the calibration step includes providing estimates to the controllers 700, 702 of portions 704 of the first and second standing volumes 218, 220 that are shared. This allows the system to further reduce wasting of water and/or user wait times, because it allows a partial or full purge of the first tap 202 to be treated as a partial purge of the second tap 212 according to the portion 704 of the first standing volume 218 that is shared by the second standing volume 220, and vice versa.

With continuing reference to FIG. 7, embodiments further reduce wastage of water by including a water recovery drain 706 as part of the purging system. For example, rather than simply flushing water down a conventional drain and into a sewer, embodiments assume that only the "cold" tap water will be consumed, and divert the flushed water through a water recovery drain 706 into the holding tank of a hot water heater 708. In other embodiments, the flushed water is diverted into a reservoir that is used for irrigation, for flushing toilets 214, or for some other purpose wherein it is not ingested.

In embodiments, an inlet flow sensor 710 is provided at the inlet 208 to the plumbing system 206 of the home or building 100. In some of these embodiments, information from the inlet flow sensor 710 is shared by a plurality of controllers 700, 702 installed at a plurality of taps 202, 212, in lieu of installing a separate flow sensor 102 at each of the taps 202, 212. In various embodiments where all of the drinking taps in the system are equipped with purging devices 100, information from the inlet sensor 710 and communication and collaboration between the controllers 700, 702 at the plurality of taps 202, 212 allows the system to perform "whole house" purges, whereby all of the taps 202, 212 initiate a purge while the inlet flow sensor 710 monitors the total water consumption of the system. In embodiments, due to overlapping portions 704 of the standing volumes 218, 220, this approach can provide a full purge of all of the taps 202, 212 while consuming less water than would otherwise be consumed if each of the purging units 700, 702 performed a separate full purge.

In some embodiments, flow sensor information from sensors located at one or more taps and or at the inlet can be used by the system to send a remote alert to a user by wired or wireless means if an apparent water leak is detected, for example if a small but steady, long-lasting flow is detected that may be a dripping tap, or a large flow is detected that continues for more than a short time, which may indicate a burst pipe.

In certain embodiments the apparatus further includes a contaminant sensor 120 that is in communication with the controller 104 and is configured to detect contaminants in the water near the tap 102, 112. In some of these embodiments, the contaminant sensor enables the controller 104 to verify the success of a purge by measuring the contaminant level of the water immediately after a purge. In some of these embodiments, a purge can be initiated upon detection by the sensor 120 of unacceptable contamination levels near the tap 202, 212, even if the purging interval has not yet elapsed.

In various embodiments, the contaminant sensor 120 is able to detect any or all of heavy metal contaminants, biological contaminants, variations in chlorine levels outside of acceptable limits, variation of the pH of the water (acidity or alkalinity) outside of acceptable limits, and/or excess turbidity of the water due e.g. to particulate contaminants. Depending on the embodiment and the type of contaminant, embodiments are able to initiate a purge that continues until the contaminant is dissipated, even if the contaminant originates at the primary water source, such as turbidity or chlorine introduced at the source during a repair. In other embodiments, the apparatus 100 is able to issue an alert to a user or owner if a change in conditions is detected. For example, the system may alert a user or owner if a persistent change in the pH (acidity or alkalinity) is detected that may change the rate at which contaminants such as lead or copper leach into the standing volume between flushes, and may therefore require a recalibration of the system.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. A volumetric flushing apparatus for flushing contaminants from a plumbing system, the plumbing system being configured during a usage event to deliver water from an exterior water inlet through a standing volume of the plumbing system to a tap, the standing volume remaining filled with water between usage events, the apparatus comprising:
   a controller;
   a timer configured to measure elapsed time;
   a valve proximal to and in flow communication with the tap, the valve being configured under control of the controller to switch between a delivery mode wherein the standing volume is connected to the tap and a flushing mode wherein the standing volume is connected to a bypass outlet; and
   a volumetric flow sensor in communication with the controller and configured to measure a volume of water flowing through the standing volume to the valve;
   the controller being configured to initiate a purge event before delivering water to the tap if the water in the standing volume is deemed by the controller to potentially contain contaminated water, where contaminated water refers to water containing more than a designated maximum level of contaminants, the purge event being an event wherein the valve is switched to its flushing mode until a purging volume of water has flowed from the standing volume into the bypass outlet and has been replaced by uncontaminated water from the exterior water inlet;
   the controller being configured to monitor usage flow volumes of water to the tap during usage events, and to designate a usage event as a purge event if the usage flow volume of the usage event is greater than the purging volume.

2. The apparatus of claim 1, wherein the apparatus further comprises a battery, and a battery charger configured to recharge the battery using energy derived from water flowing through the apparatus.

3. The apparatus of claim 2, wherein the volumetric flow sensor is a paddle wheel flow sensor, and the recharger is configured to recharge the battery using energy derived from a paddle wheel of the paddle wheel flow sensor.

4. The apparatus of claim 1, further comprising a wired or wireless interface that enables a user to communicate with the controller using a device that is remote from the controller.

5. The apparatus of claim 4, wherein the controller includes a network interface that enables remote communication between a user and the controller.

6. The apparatus of claim 1, further comprising a wireless interface that enables a user to communicate with the controller via a wireless communication link.

7. The apparatus of claim 1, wherein the volumetric flow sensor is proximal to the valve.

8. The apparatus of claim 1, wherein the volumetric flow sensor is proximal to the exterior water inlet.

9. The apparatus of claim 1, wherein the controller is operable in a demand mode, wherein, upon initiating by a user of a usage event, if the water in the standing volume is deemed by the controller to potentially contain contaminated water, the controller initiates a purge event and delays delivery of water to the tap until the purge event has completed.

10. The apparatus of claim 1, wherein the controller is operable in a periodic mode, wherein a purge event is initiated by the controller whenever the water in the standing volume is deemed by the controller to potentially contain contaminated water.

11. The apparatus of claim 1, wherein the controller is switchable between a demand mode and a periodic mode, wherein:
   in the demand mode, upon initiating by a user of a usage event, if the water in the standing volume is deemed by the controller to potentially contain contaminated water, the controller initiates a purge event and delays delivery of water to the tap until the purge event has completed; and
   in the periodic mode, a purge event is initiated by the controller whenever the water in the standing volume is deemed by the controller to potentially contain contaminated water.

12. The apparatus of claim 11, wherein the controller is operable according to a user-specified schedule that switches the controller between the demand mode and the periodic mode.

13. The apparatus of claim 1, wherein the water in the standing volume is deemed by the controller to potentially contain contaminated water whenever an elapsed time since a most recent purge event exceeds a designated purging interval.

14. The apparatus of claim 1, wherein, if a usage event that was not a purge event has occurred more recently than a most recent purge event, the controller determines whether the standing volume is deemed to potentially contain contaminated water according to an elapsed time since the most recent purge event, an elapsed time since the usage event, and the usage flow volume of the usage event.

15. The apparatus of claim 1, wherein the controller is configured to issue an alarm to a user if the volumetric flow sensor senses a pattern of flow that corresponds with unintentional leakage of water from the standing volume.

16. The apparatus of claim 1, wherein the bypass outlet is in fluid communication with a drain that transports water to a drainage system.

17. The apparatus of claim 1, further comprising a recovery drainage system in fluid communication with the bypass outlet and configured to deliver water from the bypass outlet to a storage container from which water can be used for non-ingestion purposes.

18. The apparatus of claim 1, further comprising a contamination sensor in communication with the controller and configured to detect contaminants in the water proximal to the tap.

19. The apparatus of claim 18, wherein the controller is configured to verify that the contaminated water in the standing volume has been replaced by uncontaminated water after a purge event.

20. The apparatus of claim 19, wherein the controller is configured to alert a user if the sensor detects that the contaminated water in the standing volume has not been replaced by uncontaminated water after a purge event.

21. The apparatus of claim 18, wherein the controller is configured to initiate a purge event before delivering water to the tap if the sensor detects contaminated water proximal to the tap.

22. The apparatus of claim 18, wherein the contaminant sensor is able to detect at least one of:
   the presence of a metallic contaminant in the water;
   the presence of a biological contaminant in the water;
   a deviation of chlorine concentration in the water beyond acceptable chlorine limits;
   a rise in turbidity of the water beyond an acceptable turbidity limit; and
   a deviation of the pH of the water beyond acceptable pH limits.

23. A volumetric flushing system for flushing contaminants from a plumbing system, the plumbing system being configured during a usage event to deliver water from an exterior water inlet to one of a plurality of taps through a corresponding one of a plurality of standing volumes of the plumbing system, the standing volumes remaining filled with water between usage events of the corresponding taps, the system comprising:
   at least one controller;
   at least one timer configured to measure elapsed time;
   for each of the plurality of taps, a valve proximal to and in flow communication with the tap, the valve being configured under control of the at least one controller to switch between a delivery mode wherein the standing volume corresponding to the tap is connected to the tap and a flushing mode wherein the standing volume corresponding to the tap is connected to a bypass outlet; and
   at least one volumetric flow sensor in communication with the at least one controller and configured to measure a volume of water flowing through the standing volumes to the valves that are proximal to the taps;
   for each of the taps, the at least one controller being configured to initiate a purge of the standing volume corresponding to the tap before delivering water to the tap if the water in the standing volume corresponding to the tap is deemed by the controller to potentially contain contaminated water, where contaminated water refers to water containing more than a designated maximum level of contaminants, the purge of the standing volume that corresponds to the tap including switching of the valve that is proximal to the tap to its flushing mode until a purging volume of water applicable to the tap has flowed from the standing volume into the bypass outlet corresponding to the tap, and has been replaced by uncontaminated water from the exterior water inlet;
   for each of the taps, the at least one controller being configured to monitor usage flow volumes of water to the tap during usage events of the tap, and to designate a usage event of the tap as a purge event of the tap if the usage flow volume of the usage event is greater than the purging volume applicable to the tap.

24. The system of claim 23, wherein the at least one volumetric flow sensor includes a flow sensor proximal to the exterior water inlet.

25. The system of claim 23, wherein the at least one controller determines whether a first standing volume of the plurality of standing volumes corresponding to a first tap of the plurality of taps is deemed to potentially contain contaminated water according to an elapsed time since a most recent purge of the first standing volume, and an elapsed time since a most recent purge a second of the plurality standing volumes that results in a reduction of contaminants in the first standing volume due to a shared volume that is common to the first and second standing volumes.

* * * * *